(12) United States Patent
Nuding et al.

(10) Patent No.: US 9,611,902 B2
(45) Date of Patent: Apr. 4, 2017

(54) COUPLING FOR A BELT TENSIONER

(71) Applicant: TRW Automotive Electronics & Components GmbH, Radolfzell (DE)

(72) Inventors: Martin Nuding, Waldstetten (DE); Wolfgang Holbein, Alfdorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/359,605

(22) PCT Filed: Nov. 20, 2012

(86) PCT No.: PCT/EP2012/004802
§ 371 (c)(1),
(2) Date: May 21, 2014

(87) PCT Pub. No.: WO2013/075818
PCT Pub. Date: Mar. 30, 2013

(65) Prior Publication Data
US 2014/0318915 A1    Oct. 30, 2014

(30) Foreign Application Priority Data
Nov. 25, 2011  (DE) .......................... 10 2011 119 343

(51) Int. Cl.
*F16D 41/12* (2006.01)
*B60R 22/46* (2006.01)

(52) U.S. Cl.
CPC .............. *F16D 41/12* (2013.01); *B60R 22/46* (2013.01); *B60R 2022/468* (2013.01); *B60R 2022/469* (2013.01); *B60R 2022/4666* (2013.01)

(58) Field of Classification Search
CPC .............. B60R 22/46; B60R 2022/468; B60R 2022/4666; B60R 2022/469; F16D 41/12
USPC ................ 297/475–477; 192/41 R, 46, 45.1; 242/374, 371–385.4, 381.1, 384.2, 390.8, 242/394, 394.1
See application file for complete search history.

(56) References Cited

U.S. PATENT DOCUMENTS

| 2,415,695 | A | * | 2/1947 | Cann | ...................... B23P 19/062 29/512 |
|---|---|---|---|---|---|
| 5,098,030 | A | * | 3/1992 | Kosugi | ............... B60R 22/4619 242/374 |
| 5,749,536 | A | * | 5/1998 | Specht | .................... B60R 22/46 242/374 |
| 6,196,487 | B1 | * | 3/2001 | Specht | .................... B60R 22/46 242/374 |
| 6,502,295 | B1 | * | 1/2003 | Morgand | ............. B21D 39/032 29/509 |
| 2001/0032902 | A1 | | 10/2001 | Specht | |

(Continued)

FOREIGN PATENT DOCUMENTS

| DE | 10 2006 005 434 | 8/2007 |
|---|---|---|
| EP | 2 246 225 | 11/2010 |
| GB | 2 235 618 | 3/1991 |

*Primary Examiner* — Terry Chau
(74) *Attorney, Agent, or Firm* — Tarolli, Sundheim, Covell & Tummino LLP

(57) ABSTRACT

A controllable clutch (18) for a belt tensioner (16) comprises a drive member (32), a driven element (24) and a clutch pawl (40) that is movably supported on the input side (30) between a home position and an engaged position and in the engaged position couples the drive member (32) to the driven element (24), wherein the clutch pawl (40) is tension-loaded in the engaged position.

16 Claims, 4 Drawing Sheets

(56) References Cited

U.S. PATENT DOCUMENTS

2004/0065762 A1* 4/2004 Mori ...................... B60R 22/46
242/371

* cited by examiner

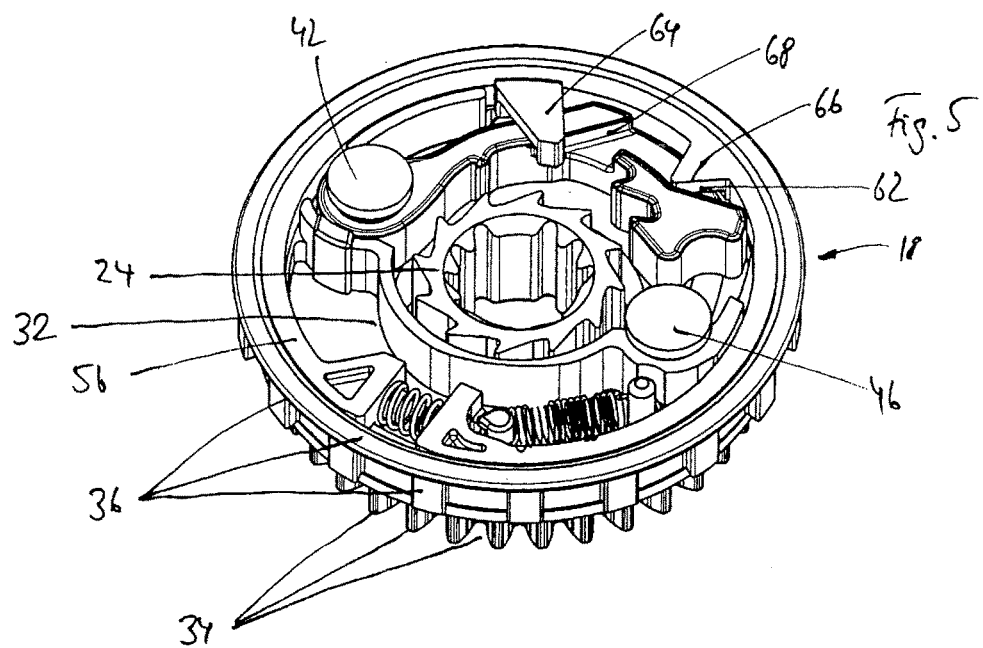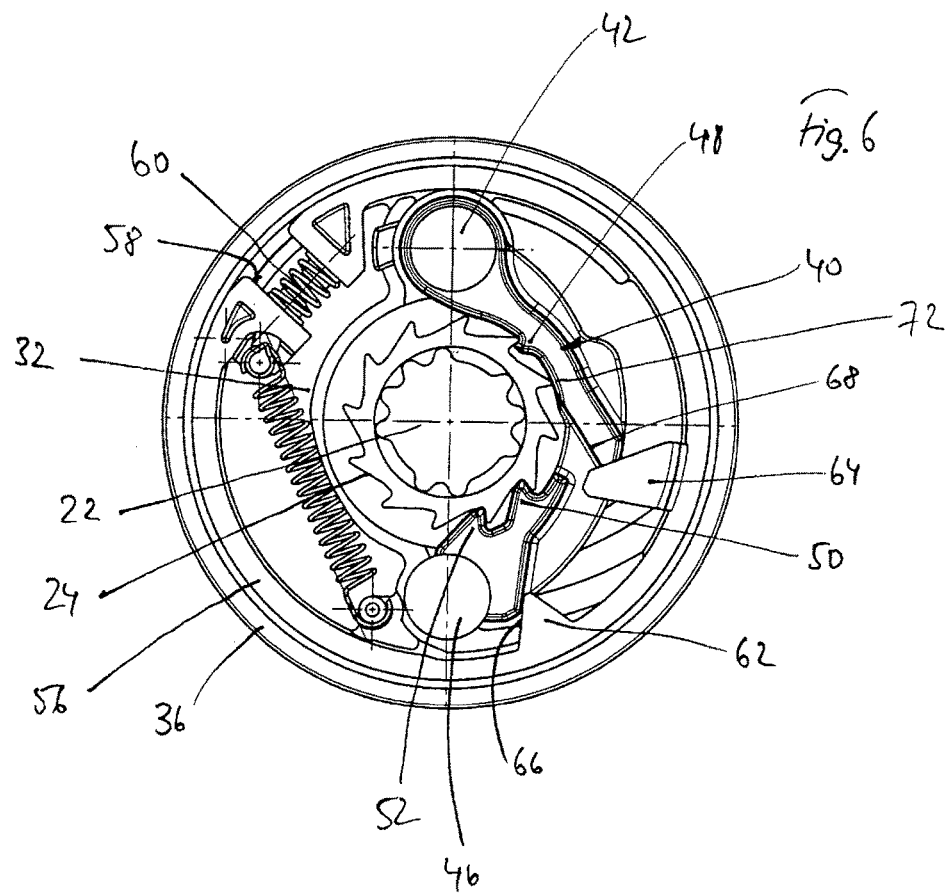

COUPLING FOR A BELT TENSIONER

RELATED APPLICATIONS

This application corresponds to PCT/EP2012/004802, filed Nov. 20, 2012, which claims the benefit of German Application No. 10 2011 119 343.3, filed Nov. 25, 2011, the subject matter, of which are incorporated herein by reference in their entirety.

BACKGROUND OF THE INVENTION

The invention relates to a controllable clutch for a belt tensioner, especially a reversible belt tensioner.

Reversible belt tensioners include a drive adapted to be coupled to the retractor axle of a belt reel by means of a clutch. During regular operation of the belt retractor the belt reel is uncoupled from said drive so that retracting or unwinding of the webbing from the belt reel is possible. In the case of tensioning the clutch is coupled to the belt reel by activation of the drive so that the webbing is wound onto the belt reel and thus is retracted.

Usually the clutch comprises a driven member having a toothing and being adapted to be coupled to a drive member via plural pawls. The pawls usually are arranged so that they are forced into the toothing by the force acting from the drive member, after the connection between the drive member and the driven element has been established. The pawls are uniformly distributed over the periphery of the driven element so that uniform force transmission takes place between the drive and the retractor axle. This is necessary to prevent additional forces due to an off-center force application. It is a drawback of those clutches that a control ensuring simultaneous engagement of all pawls is required. When the pawls are not synchronized, it is possible that individual pawls cannot be engaged and thus non-uniform force transmission to the driven element takes place.

SUMMARY OF THE INVENTION

It is the object of the invention to provide a controllable clutch for a belt tensioner that permits simple structure and more uniform force transmission between the drive and the retractor axle.

In accordance with the invention, a controllable clutch for a belt tensioner is provided comprising a drive member, a driven element and a clutch pawl which is movably supported in the drive member between a home position and an engaged position and in the engaged position couples the drive member to the driven element, wherein the clutch pawl is tension-loaded in the engaged position. The invention is based on the fundamental idea that the clutch pawl is not compression-loaded, as known in the state of the art, but is tension-loaded. The previously known clutch pawls can bear only punctually on the driven element due to the design based on compression load. The clutch pawl designed for tension load can encompass the driven element partly in the circumferential direction and thus offers a larger contact face for force transmission. Depending on the configuration of the clutch pawl, also an embodiment having merely one clutch pawl is possible, for example.

Of preference, on the drive member a bearing stud is provided on which the clutch pawl is pivoted. The bearing stud is arranged ahead of the engaging position between the driven element and the clutch pawl viewed in the direction of rotation of the drive member. For activation the clutch pawl is merely guided to the outer periphery of the driven element and is caught with the same upon rotation of the drive member. Thus simple swiveling and activation of the clutch without any additional control elements as well as simple transmission of the tensile force is possible.

Diametrically opposed to the bearing stud, a support element in the form of a stud or rivet, for example, is provided to which the free end of the clutch pawl is adjacent when the clutch pawl is provided in the engaged position. In this embodiment the clutch pawl in the engaged position encompasses the driven element in the circumferential direction over a maximum of half the periphery. In this way a connection between the clutch pawl and the driven element is possible at two approximately opposing locations so that the force application can be evenly distributed over the periphery of the driven element. In this case the support element serves for determining the position of the clutch pawl in the engaged position.

The bearing stud and/or the support element can be formed by a rivet of the housing, for example.

In order to enclose the driven element in the circumferential direction the clutch pawl extends arc-shaped starting from a bearing portion, a first clutch tooth being arranged on the side of the clutch pawl facing the driven element. Preferably the force is transmitted via at least one clutch tooth adapted to engage in a toothing on the driven element.

In order to facilitate uniform force transmission and to prevent additional moment loads due to non-uniform load transfer, at least a second clutch tooth can be provided at the clutch pawl. Ideally a third clutch tooth is provided further to the second clutch tooth.

In this embodiment, the angular distance between the second and the third clutch tooth, resp., and the bearing portion amounts to at least 120°, preferably more than 140°, especially approx. 180° related to a central axis of the clutch and an engaged condition of the clutch pawl. This minimizes an off-center loading of the driven element and thus reliably prevents additionally occurring moments.

Between the first and second clutch teeth a support surface may be provided to which the driven element is adjacent when the clutch pawl is in the engaged position. Through this support surface the clutch pawl is also adjacent to the driven element between the clutch teeth. In this way, on the one hand the position of the clutch pawl is determined independently of a support element in the engaged position. On the other hand, deformation of the bent clutch pawl is minimized with increasing tensile forces, as the clutch pawl is supported by the driven element.

Preferably, exactly one clutch pawl is provided which is capable of partly encompassing the driven element in the circumferential direction, wherein force application is possible via approximately opposing locations so that off-center force application is almost excluded. It is not required to arrange plural pawls for achieving uniform force application. Nor is any synchronization is required so that complicated control is not necessary, either.

The clutch may have a fixed housing within which the drive member is arranged so that the clutch forms an outwardly closed protected unit. In the housing a control element adapted to transfer the clutch pawl from the home position to the engaged position is preferably arranged. The drive member including the clutch pawl supported thereon is usually moved by the drive. The control element is coupled to the drive so that by the rotating drive member it causes the clutch pawl to swivel against the driven element. The clutch pawl can be rotated, for example, with the driven element and thus can be displaced against the control element so that the clutch pawl is forced against the driven element, for example, by a ramp provided at the control element. In this way the clutch pawl can be engaged without any additional moving parts or a control unit.

After a tensioning operation the belt tensioner usually is intended to be returned to the home position in which the clutch pawl is not coupled to the driven element so that regular operation of the belt retractor is possible. For this, a disengaging geometry which is adapted to reset the clutch pawl from the engaged position to the home position and thus uncouples the drive from the belt reel is preferably provided at the control element. The disengaging geometry is configured, for example, so that upon rotation of the control element in an opposite direction of rotation the clutch pawl is disengaged.

The control element can be, for instance, a ring that is friction-borne in the housing.

Such ring is not intended to co-rotate with the belt reel during regular operation of the belt retractor but is to be restrictedly rotatable with the latter upon activation of the belt tensioner. For this, the ring is preferably slotted and is biased by a compression spring in the housing. The compression spring urges the slot apart so that the ring is forced radially outwardly against the housing due to the larger diameter.

Preferably, a reset spring for biasing and de-rattling the control element in the direction of the home position is provided between the drive member and the control element. In this way disturbing noise is prevented and additionally inadvertent engagement of the control element by acceleration of the belt retractor is excluded.

BRIEF DESCRIPTION OF THE DRAWINGS

Further advantages and features are evident from the following description in combination with the enclosed drawings, in which:

FIG. 5 shows a perspective view of the clutch from FIG. 4, FIG. 6 shows a detail view of the clutch according to the invention in the coupled state.

DESCRIPTION OF EXEMPLARY EMBODIMENT

Figure 1:
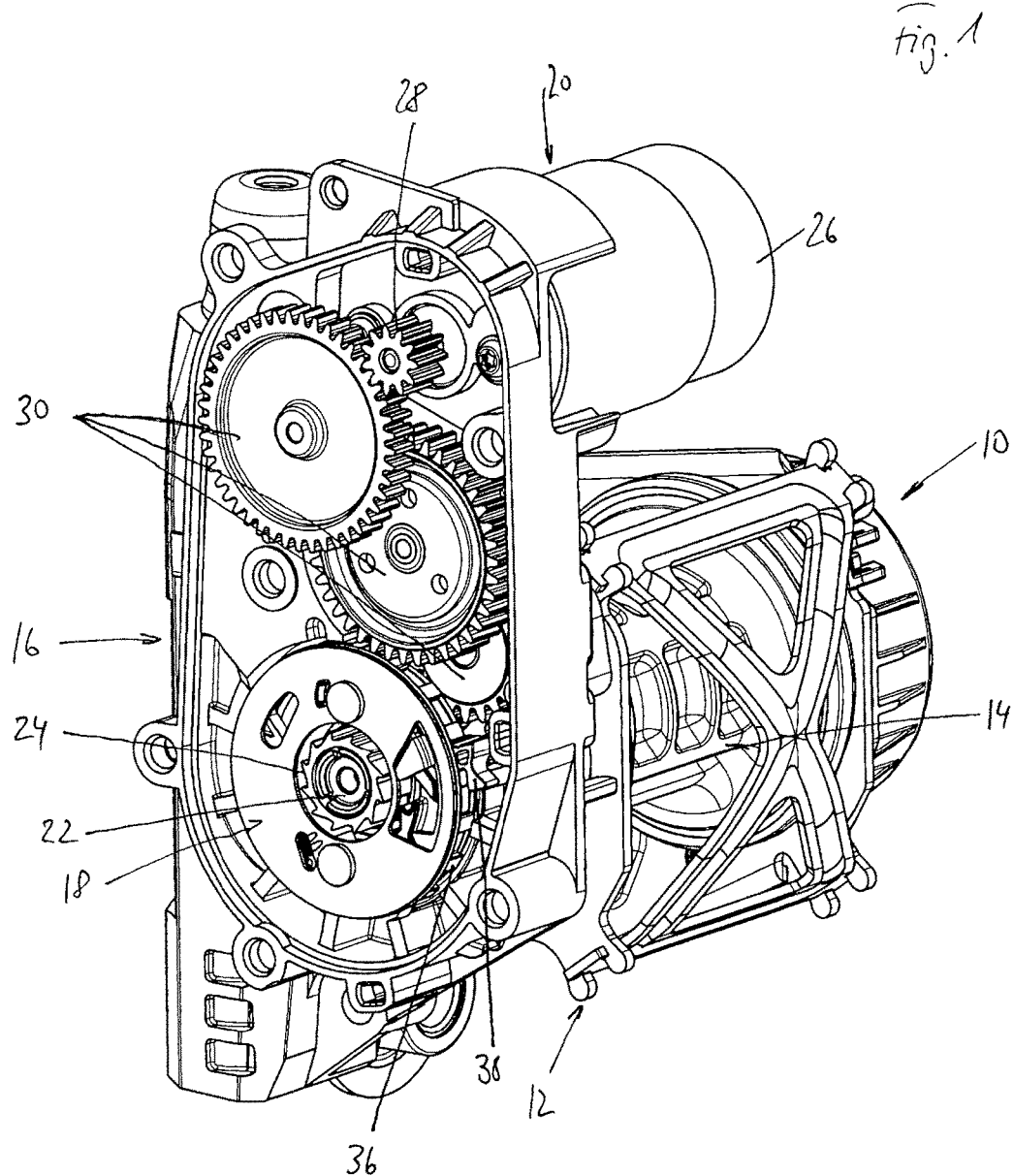
FIG. 1 shows a perspective view of a belt retractor comprising a reversible belt tensioner and a clutch according to the invention.
Figure 3:
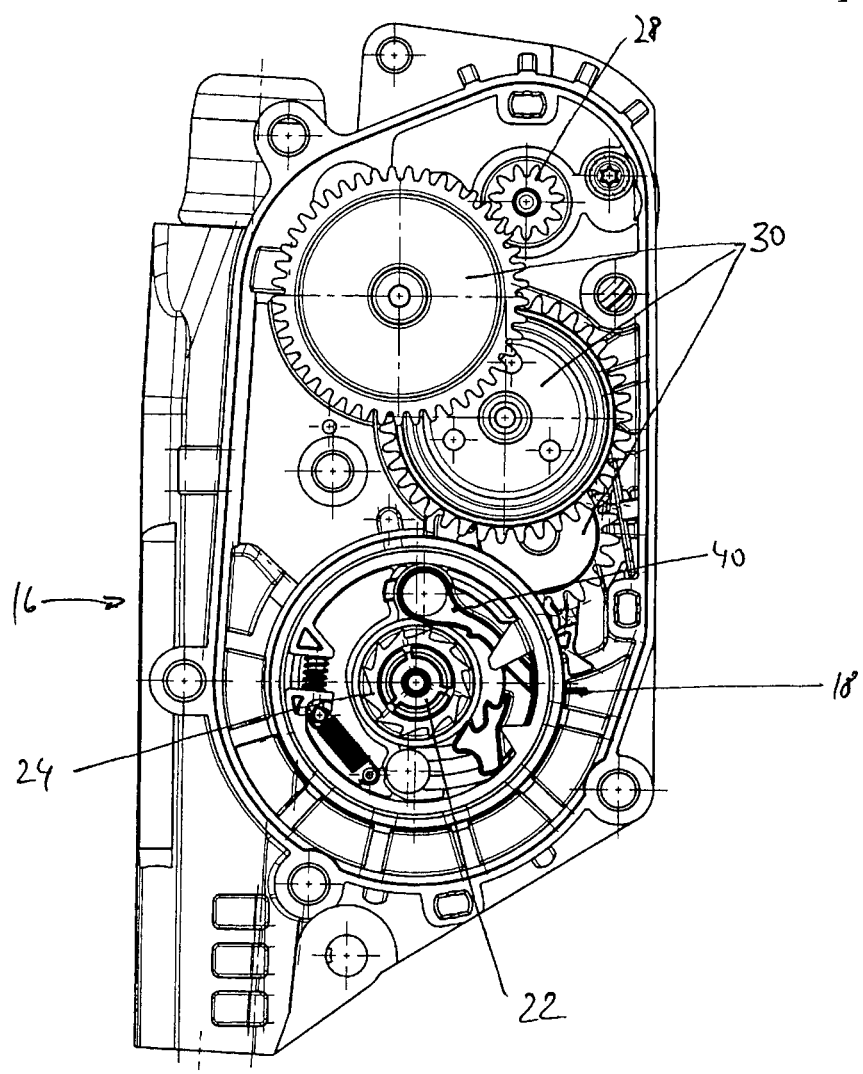
FIG. 3 shows a top view of the drive unit of a reversible belt tensioner comprising a clutch according to the invention.
Figure 2:
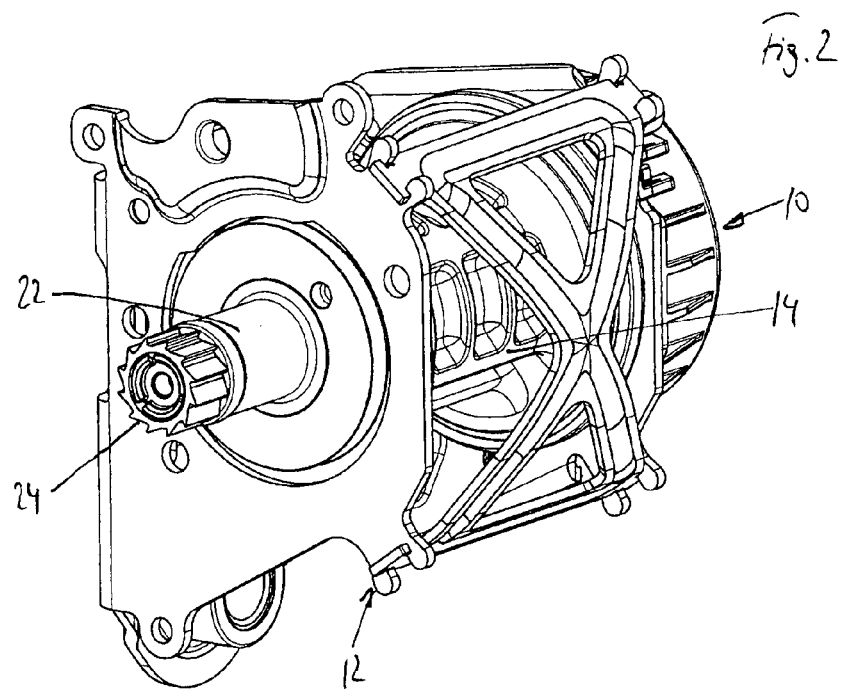
FIG. 2 shows a perspective view of the belt reel in the housing.

In FIG. 1 a belt retractor 10 for a seat belt is illustrated. The belt retractor 10 comprises a housing 12 in which a belt reel 14 for a seat belt is arranged and on which a belt tensioner 16 is disposed. The belt reel 14 is pivoted in the housing 12 and can be coupled to the drive 20 of the belt tensioner 16 by a clutch 18 shown in detail in FIGS. 4 to 6 and can be rotated in a winding direction A so as to wind up the seat belt on the belt reel 14. For this purpose, a stub shaft 22 of the belt reel projects through the housing 12. A toothing 24 is fixedly mounted on said stub shaft. In the embodiment illustrated here the toothing 24 at the same time forms the driven element of the clutch.

The drive 20 of the belt tensioner 16 includes a drive motor 26 having a motor gearwheel 28 coupled to a spur gear system 30. Said spur gear system 30 is coupled to the belt reel 14 via the clutch 18.

The input side of the clutch 18 is formed by a clutch support 32 connected to an input gearwheel 34 of the clutch in a rotationally fixed manner. The clutch support 32 is arranged inside a retaining ring 36 supported on a retaining element 38 which is arranged to be stationary on the belt tensioner so that the retaining ring is prevented from twisting. The center of said retaining ring 36 is located on an axis with the belt reel 14 and the stub shaft 22, respectively. Within said retaining ring 36 the clutch support 32 is pivoted which in turn is permanently coupled to the spur gear system through the input gearwheel 34. Hence the clutch support 32 is driven by the drive motor 26.

Figure 4:
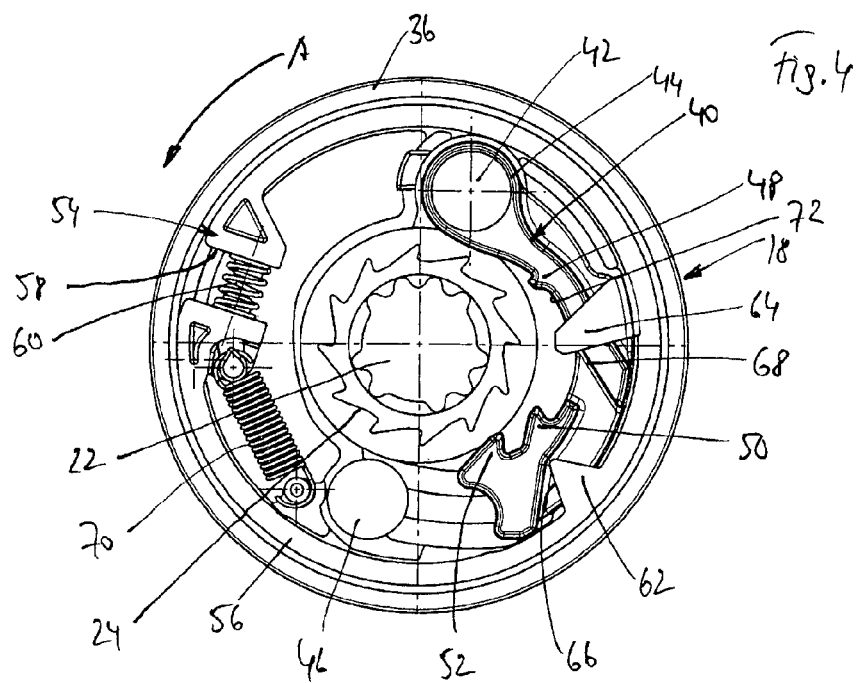
FIG. 4 shows a detail view of the clutch according to the invention in the uncoupled state.

As is especially evident from FIGS. 4 to 6, on the clutch support 32 a clutch pawl 40 is provided through which a friction-type connection can be made between the clutch support 32 and the belt reel, as will be explained hereinafter. The drive motor 26 can rotate the belt reel 14 via the motor gearwheel 28, the spur gear system 30, the input gearwheel 34, the clutch support 32, the clutch pawl 40 and the drive toothing 24 (the driven element of the clutch) and thus retract webbing.

The clutch pawl 40 is pivoted to the clutch support 30 by a bearing stud 42. As is visible especially in FIGS. 4 to 6, the clutch pawl 40 is arc-shaped starting from a bearing portion 44 bearing the clutch pawl 40 on the bearing stud 42 and extends in the circumferential direction around the drive toothing 24 of the belt reel. The clutch pawl 40 has a substantially semi-circular shape, wherein the center of the semi-circle in the engaged position of the clutch pawl—in which the clutch pawl 40 is coupled to the drive toothing 24—is located on the central axis of the belt reel 14. Diametrically opposed to the bearing stud 42 a stud-shaped support element 46 is provided to which the end of the arc-shaped clutch pawl 40 opposing the bearing portion 44 is adjacent or on which it is supported, resp., in the engaged position.

On the inside of the arc-shaped clutch pawl 40 a first clutch tooth 48 as well as second and third clutch teeth 50, 52 are provided. When the clutch pawl 40 is moved around the bearing stud 42 from the home position shown in FIGS. 4 and 5 into the engaged position shown in FIG. 6, the clutch pawl 40 engages in the drive toothing 24 with the clutch teeth 48, 50, 52. When the clutch support 32 is moved in the retracting direction A, a friction-type connection to the drive toothing 24 is established in this way and the belt reel 14 is rotated in the retracting direction A by the drive 20. The clutch pawl 40 is tension-loaded with force being transmitted by all of the clutch teeth 48, 50, 52.

In addition to the support on the support element 46, the clutch pawl 40 includes a support surface 72 by which the clutch pawl 40 is adjacent to the drive toothing in the engaged position between the first clutch tooth 48 and the second clutch tooth 50 at the inner arc side. Thus the position of the clutch pawl 40 in the engaged condition is fixed. Moreover, deformation due to the occurring tensile forces is reliably prevented as the clutch pawl 40 is supported by the drive toothing 24.

For control of the clutch pawl between the engaged position and the home position a control element 54 is provided inside the retaining ring 36.

The control element 54 includes a ring 56 arranged inside the retaining ring 36. The ring 56 has a gap 58 in which a compression spring 60 urging the ring 56 apart is provided.

The ring 56 is thus friction-forced radially outwardly against the inside of the retaining ring 36. For controlling the clutch pawl 40 an engaging geometry 62 and a disengaging geometry 64 are provided at the ring 56. The engaging geometry 62 includes a ramp 66. The disengaging geometry 64 forms a guide in which a link 68 provided at the clutch pawl is guided.

A tensile spring 70 for biasing the control element in the direction of the home position is disposed between the ring 56 of the control element 54 and the clutch support 32.

For activating the belt tensioner the drive 20 is activated so that the input side of the clutch, i.e. the clutch support 32, is rotated with the input gearwheel 34 in a retracting direction A. The clutch pawl 40 supported on the clutch support 32 is equally moved in the retracting direction A and is thus displaced against the control element 54 and the engaging geometry 62. The clutch pawl 40 is swiveled against the drive toothing 24 by the ramp 66 of the engaging geometry 62. Thus the clutch teeth 48, 50, 52 engage in the drive toothing 24, thereby the drive element of the clutch formed by the drive toothing 24 being coupled to the clutch support 32 and the input side of the clutch, respectively. As is especially evident from FIG. 6, by further rotation of the clutch support 32 the drive toothing 24 is equally rotated in the retracting direction A, whereby a seat belt is wound onto the belt reel 14. The clutch pawl 40 is tension-loaded with the force being applied to the drive toothing 24 evenly distributed over all teeth 48, 50, 52.

Since the clutch pawl 40 is tension-loaded in this case, it can be designed to be substantially longer than the usually employed compression-loaded clutch pawls so that the clutch pawl 40 can act on the drive toothing 24 by plural clutch teeth 48, 50, 52. The clutch teeth 48, 50, 52 are distributed so that the force is applied evenly over the periphery of the drive toothing so that despite only one clutch pawl additional loads can be prevented from acting on the drive toothing 24 by off-center load transfer. Preferably, the angle between the first clutch tooth 48 and the second clutch tooth 50 in a double-toothed configuration or between the first and the third clutch tooth 52 in a triple-toothed configuration amounts to at least 120°. Said angle may also amount to approx. 180° so that the first clutch tooth 48 and the second clutch tooth 50 or the third clutch tooth 52, resp., act approximately diametrically opposed on the drive toothing 24.

The connection between the drive 20 or the clutch support 32 and the drive toothing 24 can be released by rotating the drive member 30 against the retracting direction A. Then the disengaging geometry 64 acts on the link 68 of the clutch pawl 40, wherein the clutch pawl 40 is swiveled radially outwardly and is disconnected from the drive toothing 24.

The invention claimed is:

1. A controllable clutch (18) for a belt tensioner (16) comprising an input side (32), a driven element (24) and a clutch pawl (40) that is movably supported on the input side (32) between a home position and an engaged position and in the engaged position couples the input side (32) to the driven element (24),
wherein the clutch pawl (40) is tension-loaded in the engaged position,
and wherein the input side (32) is in the form of a clutch support, that a bearing stud (42) on which the clutch pawl (40) is pivoted is provided on the clutch support and that the bearing stud (42) is located ahead of the engaging position between the driven element (24) and the clutch pawl (40) viewed in the direction of rotation (A) of the input side (32),
wherein diametrically opposed to the bearing stud (42) along a diameter extending through an axis about which the input side rotates a support element (46) is provided to which a free end of the clutch pawl (40) is adjacent when the clutch pawl (40) is in the engaged position,
wherein a fixed housing (36) is provided within which the input side (32) is disposed and that a control element (54) adapted to transfer the clutch pawl (40) from the home position to the engaged position is disposed in the housing,
and wherein the control element (54) is a ring (56) which is friction-borne in the housing (36).

2. The clutch according to claim 1, wherein the bearing stud (42) constituted by a rivet.

3. The clutch according to claim 1, wherein the clutch pawl (40) extends arc-shaped starting from a bearing portion (44), with a first clutch tooth (48) being arranged on the side of the clutch pawl (40) facing the driven element (24).

4. The clutch according to claim 3, wherein spaced apart from the first clutch tooth (48) at least a second clutch tooth (50) is provided at the clutch pawl (40).

5. The clutch according to claim 4, wherein a third clutch tooth (52) is provided apart from the second clutch tooth (50).

6. The clutch according to claim 4, wherein during the engaged condition of the clutch pawl, the angular distance between the second clutch tooth (50) or the third clutch tooth (52), respectively, and the bearing portion (44) amounts to at least 120° relative to a central axis of the clutch.

7. The clutch according to claim 6, wherein during the engaged condition of the clutch pawl, the angular distance between the second clutch tooth or the third clutch tooth, respectively, and the bearing portion amounts to more than 140° relative to the central axis of the clutch.

8. The clutch according to claim 6, wherein during the engaged condition of the clutch pawl, the angular distance between the second clutch tooth or the third clutch tooth, respectively, and the bearing portion amounts to 180° relative to the central axis of the clutch.

9. The clutch according to claim 4, wherein between the first and second clutch teeth (48, 50) a support face (72) is provided to which the driven element (24) is adjacent when the clutch pawl (40) is in the engaged position.

10. The clutch according to claim 1, wherein exactly one clutch pawl (40) is provided.

11. The clutch according to claim 1, wherein at the control element (54) also a disengaging geometry (64) is provided for resetting the clutch pawl (40) from the engaged position to the home position.

12. The clutch according to claim 1, wherein the ring (56) is slotted and is braced in the housing by a compression spring (60).

13. The clutch according to claim 1, wherein a reset spring (70) acting between the input side (24) and the control element (54) is provided.

14. The clutch according to claim 1, wherein the support element is constituted by a rivet.

15. The clutch according to claim 1, wherein the support element is provided on the clutch support, the support element supporting the free end of the clutch pawl when the clutch pawl is in the engaged position.

16. The clutch accordingly to claim 1, wherein the only relative movement between the pawl and the bearing stud is pivoting of the pawl about the bearing stud.

* * * * *